United States Patent [19]

Shiraishi et al.

[11] Patent Number: 5,036,412
[45] Date of Patent: Jul. 30, 1991

[54] MAGNETIC RECORDING AND REPRODUCING APPARATUS WITH SINGLE INCLINING POST

[75] Inventors: Kenichi Shiraishi, Noda; Takamasa Uejima, Abiko; Hironobu Katayama, Noda, all of Japan

[73] Assignee: Sharp Kabushiki Kaisha, Osaka, Japan

[21] Appl. No.: 308,820

[22] Filed: Feb. 10, 1989

[30] Foreign Application Priority Data

Feb. 12, 1988 [JP] Japan ............................ 63-18043[U]

[51] Int. Cl.$^5$ ............................................ G11B 15/61
[52] U.S. Cl. .......................................... 360/85; 360/95
[58] Field of Search .......... 360/85, 95, 130.22–130.24, 360/130.3–130.32

[56] References Cited

U.S. PATENT DOCUMENTS

| 4,425,590 | 1/1984 | Johnstone et al. | 360/85 |
| 4,704,644 | 11/1987 | Takenouchi | 360/85 |
| 4,807,077 | 2/1989 | Zaitsu et al. | 360/85 |

FOREIGN PATENT DOCUMENTS

| 0022298 | 1/1981 | European Pat. Off. | 360/85 |
| 045324 | 2/1982 | European Pat. Off. | |
| 115075 | 8/1984 | European Pat. Off. | |
| 194420 | 9/1986 | European Pat. Off. | |
| 3700757 | 1/1986 | Fed. Rep. of Germany | |
| 0143254 | 6/1987 | Japan | |
| 2049258 | 12/1980 | United Kingdom | 360/85 |
| 2096817 | 10/1982 | United Kingdom | |

Primary Examiner—David J. Severin

[57] ABSTRACT

A magnetic recording and reproducing apparatus which includes a set of loading members for drawing out a magnetic tape accommodated in a tape cassette and wound around a set of reels disposed to contact the same plane. The tape storing portions of the tape cassette are directed along part of the outer peripheral surface of a rotary head cylinder in an approximately M-shape, and a single inclining member is provided in the vicinity of one tape storing portion for causing a tape travelling reference face of the magnetic tape drawn out from the tape storing portion to be inclined. The first loading member corresponding to the tape storing portion is rotatably supported at right angles with respect to the tape travelling reference face of the magnetic tape inclined by the inclining member, while the other loading member corresponding to the other tape storing portion is rotatably supported at right angles with respect to the tape travelling reference face of the magnetic tape drawn out from the other tape storing portion.

6 Claims, 4 Drawing Sheets

MAGNETIC RECORDING AND REPRODUCING APPARATUS WITH SINGLE INCLINING POST

BACKGROUND OF THE INVENTION

The present invention generally relates to a magnetic recording and reproducing apparatus such as a video tape recorder or the like, and more particularly, to a magnetic recording and reproducing apparatus of a helical scan system capable of readily realizing special reproducing functions through reduction of a tape travelling load.

FIGS. 2(a) and 2(b) show one example of a conventional magnetic recording and reproducing apparatus. A magnetic tape 44 is accommodated in a tape cassette 41 and passed around a supply reel 42 and take-up reel 43 disposed to contact the same plane within the tape cassette 41. The magnetic tape 44 is drawn out by a set of loading apparatus 58 and 59 from tape storing portions 60 and 61 of the tape cassette 41 causing the magnetic tape to contact part of the outer peripheral surface of a rotary head cylinder 50 generally in an M-shape as shown. The loading apparatus 58 and 59, respectively, include a first guide roller 48 and a first inclining post 49, and a second inclining post 51 and a second guide roller 52. The first and second inclining posts 49 and 51 are respectively disposed unrotatably in the vicinity of the rotary head cylinder 50 in an inclined state, while each of the first and second guide rollers 48 and 52 is adapted to be rotatable.

The magnetic tape 44 directed around the outer peripheral surface of the rotary head cylinder 50 is held between a capstan 56 and a pinch roller 57 so as to be driven for running.

Subsequently, the states of travelling or running of the magnetic tape 44 in the above known arrangement will be described.

The magnetic tape 44 is paid out from the supply reel 42 in a direction parallel to that of the plane to which said reels 42 and 43 contact. Therefore is twisted by the first inclining post 49 so as to be inclined in its tape travelling reference face (which is a face perpendicular to an axis of a post guiding a tape), after having been guided by a tension post 45, a rotary roller 46, an erasing head 47 and the first guide roller 48, and is helically wound around the outer peripheral surface of the rotary head cylinder 50.

The magnetic tape 44 leaving the rotary head 50 is guided by the second guide roller 52, a rotary roller 53, an audio head 54 and a fixed guide 55, after again having been twisted by the second inclining post 51 so as to be corrected in the inclination of its tape travelling reference face. Thereafter, the magnetic tape 44 is fed into the tape cassette 41 through a capstan 56 and a pinch roller 57, and wound onto the take-up reel 43.

It is to be noted here that the travelling system of the magnetic tape according to the arrangement as described so far is generally called an M loading type travelling system.

Generally, in the case where a post is vertically mounted with respect to a mounting surface (referred to as a vertical post hereinafter), adjustments may be made more easily than in the case where a post is mounted at an incline on the mounting surface by a predetermined degree (referred to as an inclining post hereinafter). Moreover, with a vertical post, it is possible to provide flanges for controlling or restricting tape running through employment of a rotatable construction, whereas in the inclining post, such flanges as in the rotatable construction can not be provided, and thus, the inclining post is disadvantageous as compared with the vertical post also from the viewpoint of tape running control.

Nevertheless, conventional magnetic recording and reproducing apparatus are arranged so that the first and second inclining posts 49 and 51 are respectively disposed in the vicinity of the inlet and output portions of the rotary head 50. These posts require the highest accuracy in the tape running system. Thus, extremely high processing accuracy is also required for the processing of these parts and considerable time and labor are necessary for the assembling and adjustments of the apparatus.

Furthermore, due to the fact that a large tape winding angle is necessary with respect to the first and second inclining posts 49 and 51, the tape travelling load is undesirably increased making it difficult to rapidly feed the magnetic tape with said tape wound around the outer peripheral surface of the rotary head 50 from the viewpoints of damage to the tape and large power consumption.

SUMMARY OF THE INVENTION

Accordingly, an essential object of the present invention is to provide a magnetic recording and reproducing apparatus in which the travelling load for the magnetic tape is reduced for achieving higher performance.

Another object of the present invention is to provide a magnetic recording and reproducing apparatus which is simple in construction and stable in functioning with high reliability.

In accomplishing these and other objects according to one preferred embodiment of the present invention, there is provided a magnetic recording and reproducing apparatus having a set of first and second loading apparatus for drawing out a magnetic tape accommodated in a tape cassette and wound around a set of reels disposed to contact the same plane. First and second tape storing portions of the tape cassette hold the tape so as to be directed along part of the outer peripheral surface of a rotary head in an approximately M-shape. A single inclining apparatus provided in the vicinity of the first tape storing portion causes a tape travelling reference face of the magnetic tape drawn out from the first tape storing portion to be inclined. The first loading apparatus corresponding to the first tape storing portion is rotatably supported at right angles with respect to the tape travelling reference face of the magnetic tape inclined by the inclining apparatus, while the second loading apparatus corresponding to the second tape storing portion is also rotatably supported at right angles with respect to the tape travelling reference face of the magnetic tape drawn out from the second tape storing portion.

By the above arrangement according to the present invention, the winding angle of the magnetic tape onto the single inclining means is extremely reduced for reduction of the travelling load for the magnetic tape.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1A:
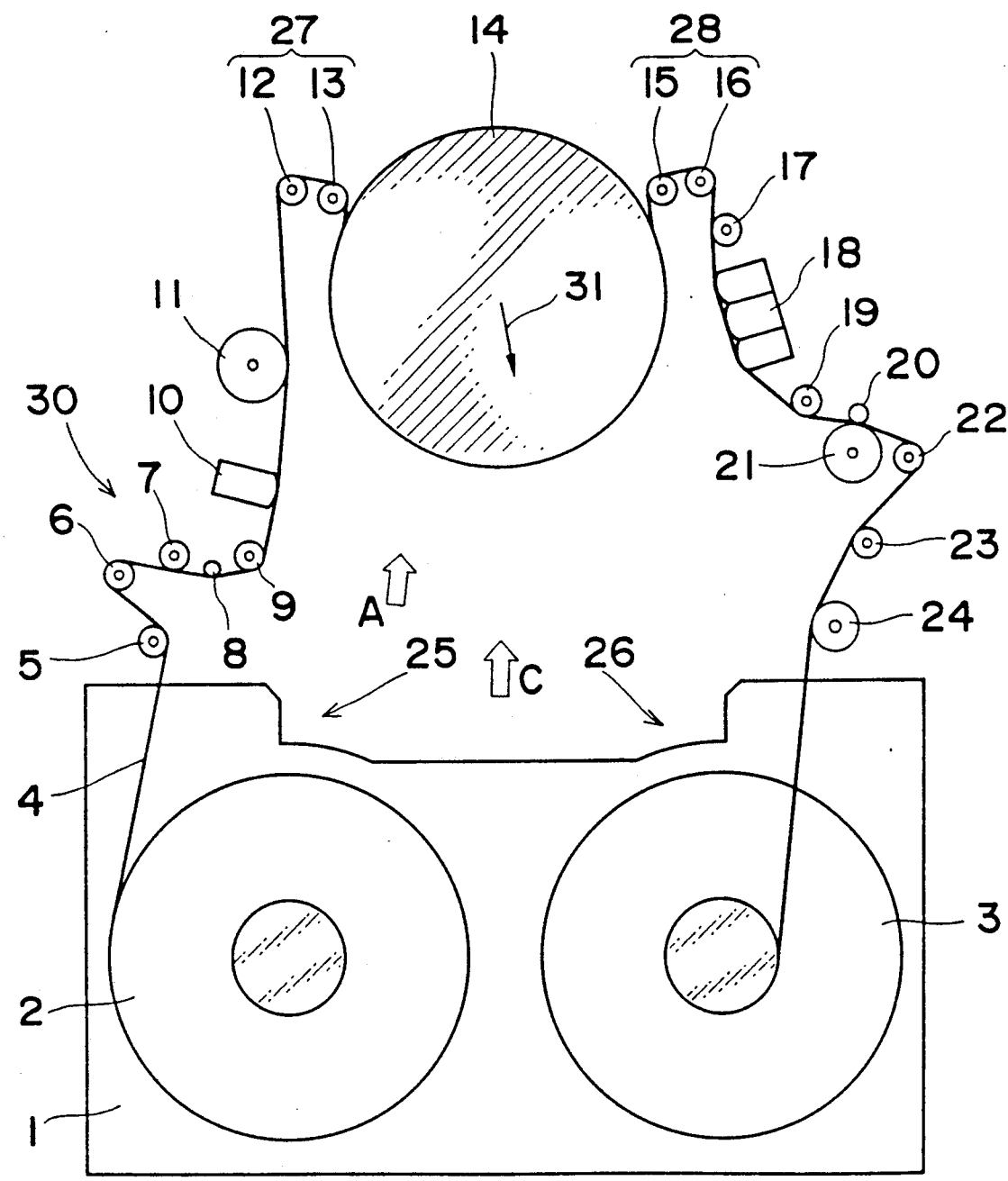
FIG. 1(a) is a schematic top plan view showing a general construction of a magnetic recording and reproducing apparatus according to one preferred embodiment of the present invention.

In the description of the present invention which follows like parts are designated by like reference numerals throughout the accompanying drawings.

FIG. 1(a) shows an improved magnetic recording and reproducing apparatus of a helical scan system according to one preferred embodiment of the present invention. The apparatus generally includes a set of loading apparatus 27 and 28 for drawing out a magnetic tape 4 accommodated in a tape cassette 1. The tape is wound around a set of supply and take-up reels 2 and 3 disposed to contact the same plane. The tape travels from tape storing portions 25 and 26 of the tape cassette 1 along part of the outer peripheral surface of a rotary head cylinder 14 in an approximately M-shape. A single inclining post 8 (inclining apparatus) provided in the vicinity (indicated by an arrow 30) of one of the tape storing portions 25 causes the tape travelling reference face of the magnetic tape drawn out from said tape storing portion 25 to be inclined.

Figure 1B:
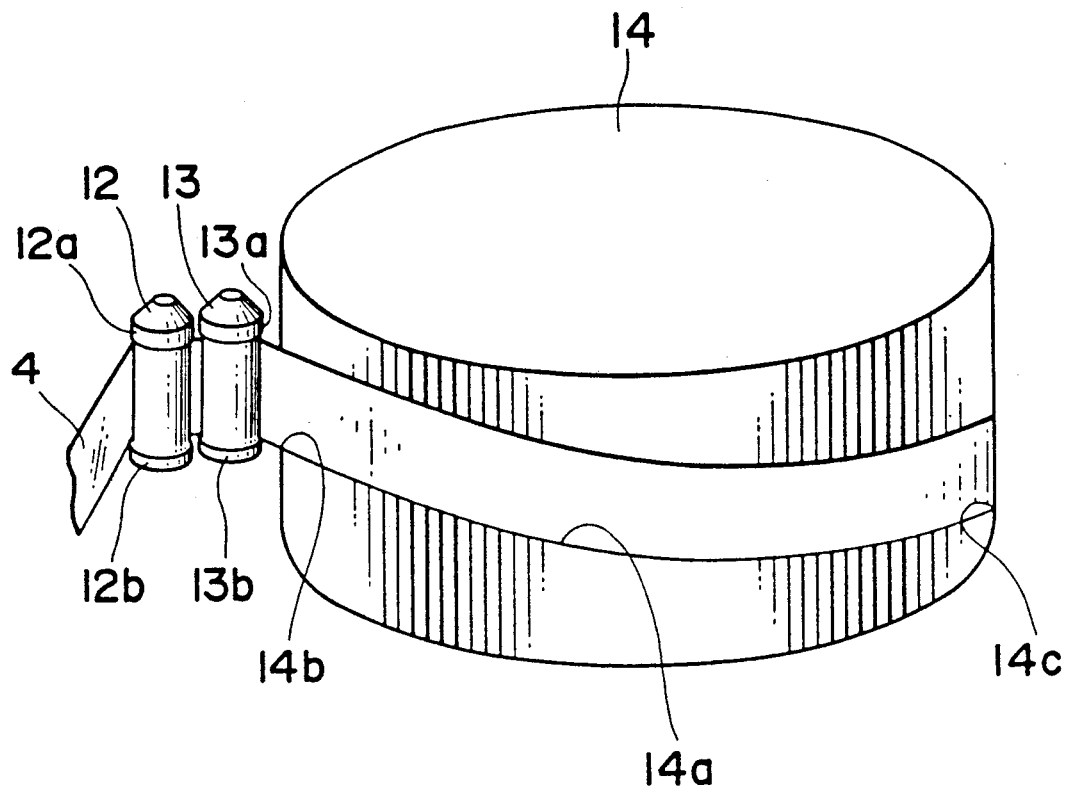
FIG. 1(b) is a fragmentary perspective view as observed in a direction indicated by an arrow A in FIG. 1(a)
Figure 1C:
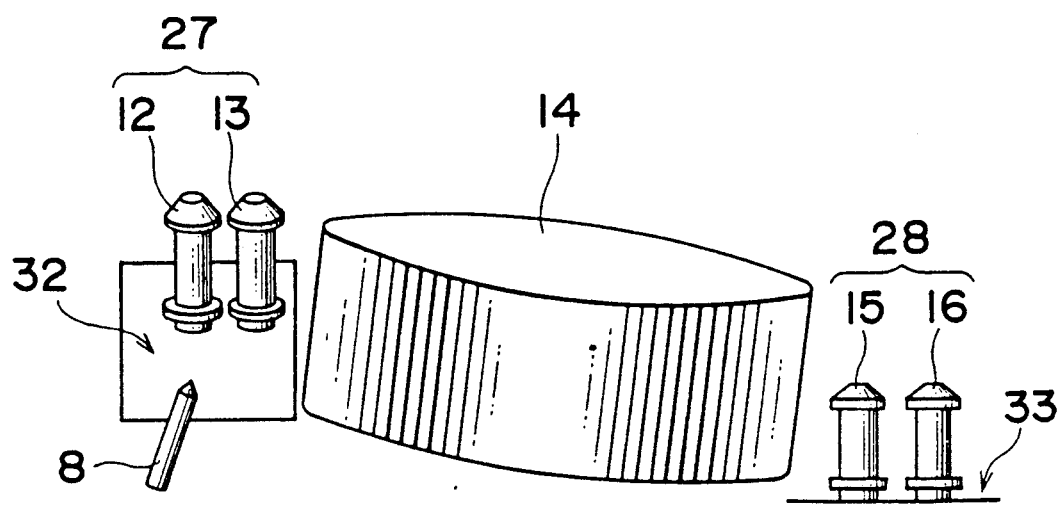
FIG. 1(c) is also a fragmentary perspective view as seen in a direction indicated by an arrow C in FIG. 1(a)

One loading apparatus 27 corresponding to said tape storing portion 25 includes rollers 12 and 13 rotatably supported at right angles with respect to the tape travelling reference face (face shown by an arrow 32 in FIG. 1(c)) of the magnetic tape 4 inclined by said inclining post 8 as shown in FIG. 1(c). Moreover, at upper and lower ends of the rollers 12 and 13, flanges 12a and 12b, and 13a and 13b (FIG. 1(b)) are respectively formed for effecting control of the travelling magnetic tape 4.

The magnetic tape 4 is inclined by the inclining post 8 and helically wound onto the rotary head cylinder 14, while the rotary head cylinder 14 is disposed to be inclined in a direction to correct the inclination of the tape travelling face of the magnetic tape 4. More specifically, the rotary head cylinder 14 is inclined by the same degree as a lead angle in a direction opposite (direction indicated by an arrow 31) to that of the magnetic tape 4 as it leaves the rotary head cylinder 14. A lead portion 14a is formed spirally on the rotary head cylinder 14 (FIG. 1(b)) so that it is at its highest on the cylinder at an inlet portion 14b, and lowest at an outlet portion 14c so as to be at the same height as that of the lower edge of the magnetic tape 4 within the tape cassette 1.

The other loading apparatus 28 corresponding to the tape storing portion 26 includes rollers 15 and 16 rotatably supported at right angles with respect to the tape travelling reference face (shown by an arrow 33 in FIG. 1(c)) of the magnetic tape 4 drawn out from the tape storing portion 26. Although not particularly shown, at upper and lower ends of the rollers 15 and 16, flanges are respectively formed for controlling the travelling magnetic tape 4 in a manner similar to that using the rollers 12 and 13 for the loading apparatus 27.

Using the arrangement according to the present invention as described above, the magnetic tape travels through the system as described hereinafter.

The magnetic tape 4 paid out from the supply reel 2 in parallel to the plane to which the supply and take-up reels 2 and 3 contact, is twisted by the inclining post 8, and so its tape travelling reference face is inclined. Thereafter, the magnetic tape 4 is guided by a rotary roller 9, an erasing head 10, another rotary roller 11 and the rollers 12 and 13 of the loading means 27. These parts are directed perpendicularly to the tape travelling reference face of the inclined magnetic tape 4. And then, the tape is helically wound around the outer peripheral face of the rotary head cylinder 14.

Subsequently, after leaving the rotary head cylinder 14, the magnetic tape 4 corrected for the inclination of the tape travelling reference face by said rotary head cylinder 14 is delivered towards the tape storing portion 26 of the tape cassette 1 by a capstan 20 and a pinch roller 21 through the rollers 15 and 16 of the loading means 28, a rotary roller 17, an audio head 18 and another rotary roller 19, and is further wound onto the tape-up reel 3 through rotary rollers 22, 23 and 24.

It should be noted here that, in the above case, the rollers 5, 6, 7, 15, 16, 17, 19, 22, 23 and 24, the audio 18, the capstan 20 and the pinch roller 21, are all directed perpendicularly with respect to the same plane to which the supply reel 2 and the take-up reel 3 contact.

Accordingly, in the magnetic recording and reproducing apparatus of the present invention having the afore-described construction, since the winding angle of the magnetic tape 4 onto the inclining post 8 is extremely reduced, while all the rollers other than said inclining post 8 may be arranged to be rotatable, the travelling load of the magnetic tape 4 can be made very small.

Additionally, flanges on the rollers 13 and 15 are located respectively close to the inlet portion 14b and the outlet portion 14c of the rotary head cylinder 14 for effectuating running control of the magnetic tape 4 with accuracy.

Figure 2A:
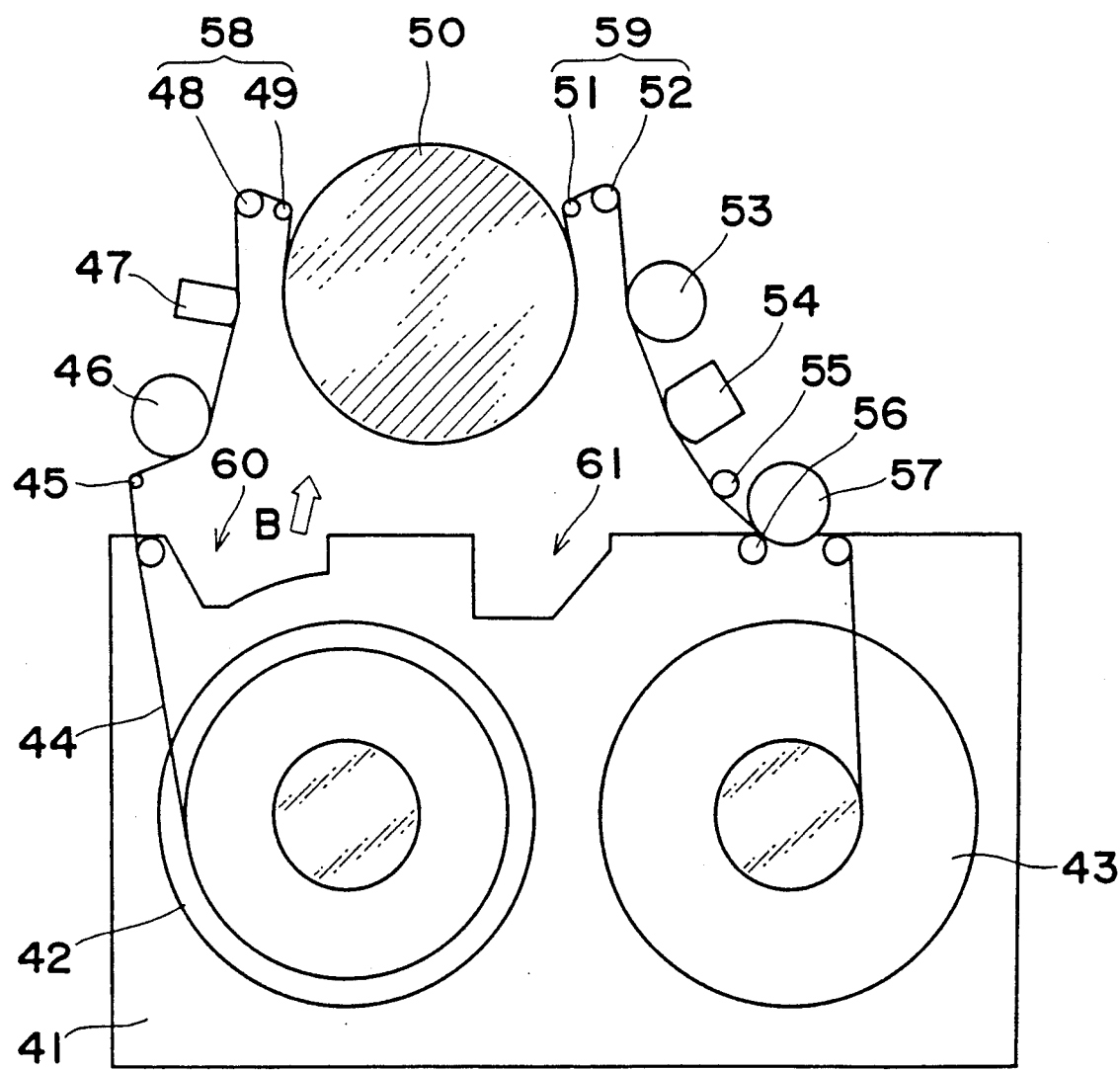
FIG. 2(a) is a schematic top plan view showing a general construction of a conventional magnetic recording and reproducing apparatus.
Figure 2B:
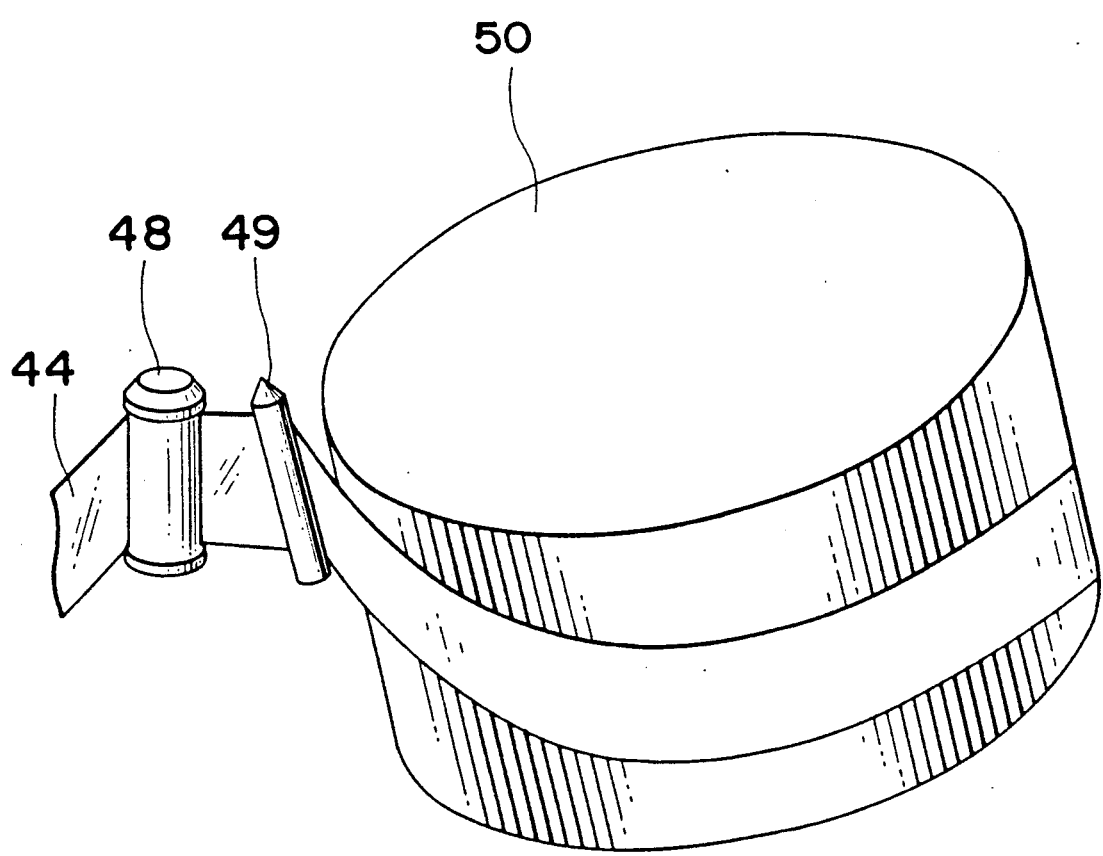
FIG. 2(b) is a fragmentary perspective view as observed in a direction indicated by an arrow B in FIG. 2(a).

For example, in conventional recording and reproducing apparatus, as shown in FIGS. 2(a) and 2(b), the winding angle of the magnetic tape 44 onto the first and second inclining posts 49 and 51 is about 140°, whereas the winding angle of the magnetic tape 4 onto the inclining post 8 in the arrangement according to the present invention is approximately 26°.

It should also be noted that in the foregoing embodiment, although the loading apparatus 27 is constituted by the rollers 12 and 13, and the loading apparatus 28, by the rollers 15 and 16, this may be so modified so as to form each of the loading apparatus 27 and 28 by one roller.

As is clear from the foregoing description the present invention materially reduces the travelling load thereby increasing travelling control. The magnetic recording and reproducing apparatus is characterized in that it includes the set of first and second loading apparatus for drawing out the magnetic tape accommodated in the tape cassette and wound around the set of reels disposed to contact the same plane. The first and second tape storing portions of the tape cassette are designed for directing the tape along part of the outer peripheral surface of the rotary head cylinder in an approximately M-shape. A single inclining apparatus provided in the vicinity of the first tape storing portion causes the tape travelling reference face of the magnetic tape drawn out from the first tape storing portion to be inclined. A first loading apparatus corresponding to the first tape storing portion is rotatably supported at right angles with respect to the tape travelling reference face of the magnetic tape inclined by the inclining post, while the second loading means corresponding to the second tape storing portion is rotatably supported at right angles with respect to the tape travelling reference face of the magnetic tape drawn out from the second tape storing portion. It is thereby possible to extremely reduce the winding angle of the magnetic tape onto the inclining means, and accordingly, the travelling load of the entire travelling system of the magnetic tape can be decreased. Moreover, since the loading apparatus positioned in the vicinity of the rotary head cylinder may be rotatable arranged, with flanges being provided on the loading apparatus, the travelling control of the magnetic tape may be effected at high accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recording and reproducing apparatus for reading and writing information from and to a magnetic tape with at least one traveling reference face and stored in a cassette, said cassette having first and second tape storing portions, the apparatus comprising:

rotary head cylinder means for reading and recording information from and to said magnetic tape;

first and second loading means positioned adjacent to said first and second storing portions of said cassette for extracting said magnetic tape from said cassette and positioning said tape in contact with said rotary head cylinder means thereby said tape forms an "M" shape among said cassette, rotary head cylinder means and said first and second loading means; and a single inclining means positioned near the first storing position of said cassette for inclining the reference face of said magnetic tape onto said rotary head cylinder means thereby reducing the winding angle of the tape and correspondingly the traveling load on the tape, said single inclining means being fixedly disposed at the magnetic face side of the magnetic tape, and spaced from said first and second loading means.

2. A magnetic recording and reproducing apparatus as claimed in claim 1, wherein each of said first and second loading means comprise a single rotatable roller.

3. A magnetic recording and reproducing apparatus as claimed in claim 1, wherein said single inclining means includes a single included post.

4. A magnetic recording and reproducing apparatus as recited in claim 1, wherein said single inclining means is aligned for feeding said magnetic tape to said rotary head cylinder means at an angle of approximately 26 degrees with respect to the plane defined by said first and second loading means.

5. A magnetic recording and reproducing apparatus as claimed in claim 1, wherein each of said first and second loading means includes two rotatable rollers.

6. A magnetic recording and reproducing apparatus as claimed in claim 5, wherein each of said rotatable rollers further comprises flange portions at its upper and lower ends for effecting traveling control for the magnetic tape.

* * * * *